(12) United States Patent
Delest et al.

(10) Patent No.: US 6,875,456 B2
(45) Date of Patent: Apr. 5, 2005

(54) PROTEIN HYDROLYSATES

(75) Inventors: Veronique Delest, Antony (FR); Luppo Edens, JL Rotterdam (NL); Jan Gerrit Kortes, HV Leusden (NL); Thierry Jean-Bernard Naeye, Toufflers (FR)

(73) Assignee: DSM IP Assets B.V., Het Overloon (NL)

( * ) Notice: Subject to any disclaimer, the term of this patent is extended or adjusted under 35 U.S.C. 154(b) by 0 days.

(21) Appl. No.: 10/399,485
(22) PCT Filed: Oct. 17, 2001
(86) PCT No.: PCT/EP01/12104
§ 371 (c)(1), (2), (4) Date: Oct. 16, 2003
(87) PCT Pub. No.: WO02/32232
PCT Pub. Date: Apr. 25, 2002

(65) Prior Publication Data
US 2004/0067279 A1 Apr. 8, 2004

(30) Foreign Application Priority Data
Oct. 19, 2000 (EP) .................... PCT/EP00/10345

(51) Int. Cl.$^7$ .............................. A23J 3/34; C12P 21/06
(52) U.S. Cl. ........................ 426/63; 426/656; 426/42; 426/46; 426/52; 426/56; 435/68.1
(58) Field of Search .......................... 435/68.1; 426/34, 426/42, 46, 52, 56, 63, 574, 582, 592, 656, 43

(56) References Cited

U.S. PATENT DOCUMENTS

| | | | | |
|---|---|---|---|---|
| 5,486,461 A | * | 1/1996 | Nielsen | 435/68.1 |
| 6,007,851 A | * | 12/1999 | Schoenmaker et al. | 426/46 |
| 6,242,036 B1 | * | 6/2001 | Han et al. | 426/582 |
| 6,251,443 B1 | * | 6/2001 | Chigurupati et al. | 426/18 |
| 6,372,452 B1 | * | 4/2002 | Millan Rodriguez et al. | 435/68.1 |
| 6,416,796 B1 | * | 7/2002 | Han et al. | 426/36 |
| 6,551,636 B2 | * | 4/2003 | Chen | 426/42 |
| 6,787,168 B1 | * | 9/2004 | Sawhill | 426/41 |

FOREIGN PATENT DOCUMENTS

| | | |
|---|---|---|
| EP | 0274946 | 7/1988 |
| EP | 0495391 | 7/1992 |
| EP | 0799577 | 10/1997 |
| EP | 0834573 | 4/1998 |
| GB | 1547832 | 6/1979 |
| WO | WO 94/25580 | 11/1994 |
| WO | WO 98/14599 | 4/1998 |
| WO | WO 98/27827 | 7/1998 |
| WO | WO 98/27828 | 7/1998 |

OTHER PUBLICATIONS

Hurrell, R. F., "Maillard Reaction in Flavour" Chapter 6 In Food Flavours Part A: Introduction Morton, I. and Macleod, A. (eds.) Elsevier Scientific Publishing Company pp. 399–437 (1982).

Minagawa, E. et al., "Debittering Mechanism in Bitter Peptides of Enzymatic Hydrolysates from Milk Casein by Aminopeptidase T" Journal of Food Science 54(5):1225–1229 (1989).

Voigt, J. et al., "In Vitro Studies on the Proteolytic Formation of the Characteristic Aroma Precursors of Fermented Cocoa Seeds: The Significance of Endoprotease Specificity" Food Chemistry 51:7–14 (1994).

* cited by examiner

Primary Examiner—Keith Hendricks
(74) Attorney, Agent, or Firm—Morrison & Foerster LLP

(57) ABSTRACT

The present invention describes protein hydrolysates: obtainable by the hydrolysis of a protein containing substrate; comprising free amino acids and peptides; and wherein the molar fraction of at least one free amino acid, present in the protein hydrolysate is at least a factor 2.5, preferably at least a factor 3, more preferably at least a factor 3.5 times higher than in a hydrolysate of the same protein containing substrate which has been completely hydrolysed to free amino acids, wherein the molar fraction of the at least one free amino acid in the protein hydrolysate is at least 25%; and wherein the Amino Acid Quotient (AAQ) in the protein hydrolysate is at least 10%. These protein hydrolysates can be used in the preparation of food compositions, wherein these protein hydrolysates provide for novel and unexpected flavours. Moreover these protein hydrolysates are applicable in personal care applications.

24 Claims, No Drawings

PROTEIN HYDROLYSATES

This application is a 371 of PCT/EP01/12104, filed Oct. 17, 2001.

FIELD OF THE INVENTION

The present invention describes protein hydrolysates and their use in food compositions.

BACKGROUND OF THE INVENTION

The present invention relates to protein hydrolysates and their use in foodstuffs.

Hydrolysed proteins from a variety of sources are used widely in the food industry. For instance, they are commonly employed as a component in dehydrated soups, as flavourings and in other processed foodstuffs to obtain e.g. food flavourings after a Maillard reaction. They also find medical use as dietary supplements for patients suffering from a variety of diseases and metabolic disorders. Relatively new developments are their use in products for consumers with non-medical needs as athletes or people on a slimming diet and in personal care applications. Furthermore in situ hydrolysed proteins play an important role in the development of flavours in fermented food products. In the latter products the microbial starter cultures used usually excrete proteolytic enzymes responsible for hydrolysis of the raw material into amino acids. Metabolic transformation of these aminoacids leads to potent flavour compounds and volatiles characteristic for e.g. fermented dairy products such as cheese or yogurts, various meat products, beers and wines.

Although conventional protein hydrolysates are prepared by subjecting the protein source to harsh chemical conditions, there has been an increased interest in obtaining such hydrolysates by enzymatic hydrolysis. Both the chemical and the enzymatic route aim to release high levels of amino acids from the protein source with maximum efficiency and lowest cost. For that reason cheaply available protein sources like soy meal and wheat gluten are popular substrates for preparing hydrolysates. To liberate as many amino acids as possible, the enzymatic route employs either complex mixtures of several endo- and exoproteases (e.g. International Patent Application WO94/25580) or it combines endoproteases with a single but broad spectrum exoprotease (International Patent Application WO-A-98/27827). In all cases the aim is to obtain a high degree of hydrolysis and an end product that contains a large variety of free amino acids.

Though free amino acids as such, can elicit a number of taste impressions, these taste impressions are very basic (bitter, sweet, sour and "umami") and the amino acid concentration required for perceiving these tastes are high. Threshold values for individual amino acids can range from 0.3–80 millimoles/liter. Despite these high threshold values, free amino acids can create major sensory effects at much lower concentration ranges through a number of mechanisms.

One of these mechanisms involves free glutamate and can create strong savoury enhancing effects because of the synergy between glutamate and 5'-ribonucleotides. If combined with proper concentrations of 5'-ribonucleotides such as 5'-IMP and 5'-GMP, the detection threshold of the umami taste generated by glutamate is known to be lowered by almost two orders of magnitude.

Another flavour enhancing mechanism involves Maillard reactions. Compared with free amino acids, Maillard products in which free amino acids have been reacted with sugars exhibit much more impressive taste and odour characteristics. In Maillard reactions overwhelmingly complex flavour and odour systems can develop with threshold values that are several orders of magnitude lower than those recorded for the free amino acids.

Maillard products are formed at elevated temperatures usually during cooking, baking or roasting when preparing food. During these treatments both colour and a large array of aromas develop. In these reactions amino groups react with reducing compounds as a first step and ultimately leading to a whole family of reaction pathways. In foods the amino compounds involved are predominantly free amino acids and proteins and the reducing compounds primarily represent reducing sugars. Factors that influence the Maillard reaction include the type of sugar and amino acid involved as well as physical factors such as the pH, temperature, water activity (aw), reaction time, and so on.

Both mono as well as disaccharides can take part in the Maillard reaction. Generally speaking aldoses are more reactive than ketoses and pentoses more than hexoses or disaccharides, and so whereas the type of sugar strongly influences the amount of flavouring compounds generated, the amino acid involved in the reaction largely determines the nature of the flavour formed. For example, the inclusion of pure methionine in Maillard reaction systems often leads to vegetable or stewed notes, pure cysteine leads to meat-like flavours, pure proline, hydroxy proline and leucine to bakery aromas (R. F. Hurrell, Food Flavours, Part A: Introduction, Elsevier Scientific Publishing Company, Eds.: I. D. Morton and A. J. Macleod). Since these results have been obtained using pure amino acids rather than mixtures of several amino acids, as occur in food ingredients, it is evident that the outcome represents only a gross simplification of the natural situation. Likewise, the sugars that naturally occur in food will have an impact, and further complicate and affect the development of taste and aroma.

Apart from Maillard reactions, amino acids can also undergo important chemical transitions at ambient temperatures. The latter type of transitions are enzyme dependent and are quite common in fermented foods such as beer, yogurt, cheese ripening and meat and wine maturation processes. In these fermentation processes, free amino acids are liberated from the raw materials used by proteolytic enzyme activity from either the raw material or the microbial starters used. During the maturation phase microbial metabolic activity then converts the free amino acids into derivatives with increased sensoric properties. For example, L-leucine, L-isoleucine and L-valine lead to the formation of valuable fusel alcohols like amylalcohols and isobutanol in beer fermentation. L-leucine is known as the precursor for cured meat compounds such as 3-methylbutanal and 3-methylbutanol, whereas L-phenylalanine can lead to benzacetaldehyde. Similarly cheese volatiles such as methanethiol and dimethyldisulphide have been traced back to the occurrence of methionine in cheese as well as methylpropanoic acid and methylpropanal to valine. Accordingly the "sur-lie" method used in wine making and known to generate tastier wines, can be ascribed to the increased presence of amino acids such as aspartic acid, arginine, alanine, leucine and lysine.

Prior art processes for protein hydrolysis (WO94/25580 and WO98/27827) aim at releasing all available amino acids and the presence of so many different amino acids will blur the desired pronounced taste or aroma note in the final product.

WO98/14599 refers to certain polypeptides obtained from *Aspergillus oryzae* and to hydrolysates prepared with these polypeptides in combination with (specific or unspecific) endopeptidases and (specific or unspecific) exopeptidases. WO98/14599 mentions hydrolysates that have an increased content of Leu, Gly, Ala and/or Pro, such as 1.1 times greater but uses for such hydrolysates are not mentioned.

European patent application EP-A-799577, describes a whey protein hydrolysate wherein the Phe (phenylalanine) content is reduced. This whey protein hydrolysate is used as food for patients suffering from PKU (phenylketonuria).

Voigt et al (Food Chemistry 51 (1994) pp. 7–14) describes the production of the cocoa-specific aroma precursors by in vitro proteolysis of seed proteins. Cocoa-specific aroma precursors can only be obtained by specific hydrolysis of only one substrate, which is cocoa vicillin-class globulin proteins.

DESCRIPTION OF THE INVENTION

According to the present invention, the desired flavour effect can be obtained if the molar fraction of a single desired free amino acid in the protein hydrolysate according to the invention is at least 2.5 times higher (enrichment factor) than would have been obtained by acid hydrolysis of the same protein containing substrate. It is demonstrated by the present invention that such protein hydrolysates can be obtained by certain combinations of enzymes, often with a selected protein containing substrate.

The present invention provides amongst others for a protein hydrolysate:
  obtainable by the enzymatic hydrolysis of a protein containing substrate;
  comprising free amino acids and peptides;
  wherein the molar fraction of at least one free amino acid, present in the protein hydrolysate is at least a factor 2.5, preferably at least a factor 3, more preferably at least a factor 3.5 times higher than in a hydrolysate of the same protein containing substrate which has been completely hydrolysed to free amino acids, thus the enrichment factor is at least 2.5, preferably at least 3 and more preferably at least 3.5;
  wherein the molar fraction of the at least one free amino acid in the protein hydrolysate is at least 25%; and
  wherein the amino acid quotient (AAQ) in the protein hydrolysate is at least 10%.

The invention further relates- to a food composition comprising a protein hydrolysate according to the invention.

The present invention further relates to a process for preparing a protein hydrolysate, which process comprises:
  hydrolysing under aqueous conditions at a temperature of 5 to 75° C., and at a pH of 3 to 9, a protein containing substrate with an endoprotease and an exoprotease, whereby the combined action of endoprotease and exoprotease releases at least one free amino acid from the protein containing substrate, and incubating the endoprotease and exoprotease for a period of time suitable to obtain a protein hydrolysate, wherein the molar fraction of at least one free amino acid present in the protein hydrolysate is at least a factor 2.5, preferably at least a factor 3, more preferably at least a factor 3.5 times higher than in a hydrolysate of the same protein containing substrate which has been completely hydrolysed to free amino acids;
  wherein the molar fraction of the at least one free amino acid in the protein hydrolysate is at least 25%; and
  wherein the amino acid quotient (AAQ) in the protein hydrolysate is at least 10%.

Further the present invention relates to a protein hydrolysate characterized in that it is either:
  (a) a whey protein hydrolysate or corn protein hydrolysate comprising a molar fraction of free leucine of at least 25;
  (b) a whey protein hydrolysate comprising a molar fraction of free lysine of at least 25%;
  (c) a soy protein hydrolysate comprising a molar fraction of free arginine of at least 25%;
  (d) a soy protein hydrolysate comprising a molar fraction of free lysine of at least 25%;
  (e) a hemoglobin hydrolysate comprising a molar fraction of free leucine of at least 25%; or
  (f) a bovine serum albumin (BSA) hydrolysate fraction of free glutamate of at least 25%.

In general the AAQ will be less than 40%, preferably the AAQ is between 15 and 30%. In general the molar fraction of the at least one amino acid is less than 80%, preferably this molar fraction is between 25 and 50%, more preferably between 25 and 40%.

Preferably the hydrolysis of the protein containing substrate is an enzymatic hydrolysis, more preferably an enzymatic hydrolysis by an endoprotease and an exoprotease.

We have found that food compositions comprising the protein hydrolysates according to the invention, obtain an improved flavour e.g. after it has been fermented, processed, cooked and/or reacted with reducing sugars.

The molar fraction of a certain free amino acid in a composition is defined as the molar concentration of that free amino acid in the composition, divided by the sum of the molar concentrations of all free amino acids Alanine, Arginine, Asparagine, Aspartic acid, Glutamine, Glutamic acid, Glycine, Histidine, Isoleucine, Leucine, Lysine, Methionine, Phenylalanine, Proline, Serine, Threonine, Tyrosine and Valine in that same composition, x100%. By total or all amino acids throughout this specification is meant the total of Alanine, Arginine, Asparagine, Aspartic acid, Glutamine, Glutamic acid, Glycine, Histidine, Isoleucine, Leucine, Lysine, Methionine, Phenylalanine, Proline, Serine, Threonine, Tyrosine and Valine.

The determination of the molar fraction of a certain free amino acid in the enzymatically hydrolysed compostion as well as of a certain free amino acid in a composition obtained by completely hydrolysing the protein containing substrate is described in the Materials and Methods section.

Furthermore the total of the amounts of free Gln and Glu, and free Asn and Asp, respectively, which are liberated during enzymatic hydrolysis were taken to enable comparison with the amount of free Glu and Asp obtained after complete hydrolysis with strong acid (acid hydrolysis deamidates Gln and Asn residues, resulting in "additional" free Glu and free Asp). In general, for Glu and Gln, the sum of the molar fractions of Glu and Gln is at least a factor 2.5 (enrichment factor), preferably at least a factor 3, more preferably at least a factor 3.5 times higher than the sum of the molar fractions of Glu and Gln in a hydrolysate of the same protein containing substrate which has been completely hydrolysed to free amino acids. By the enrichment factor of an free amino acid is meant the molar fraction of the free amino acid present in a protein hydrolysate divided by the molar fraction of the free amino acid in protein hydrolysate which is completely hydrolysed to free amino acids. In case the Glu/Gln ratio is known, for example in case of single chain protein (see for instance Example 8) Glu and Gln can be calculated seperately. For Asp and Asn, the sum of the molar fractions of Asp and Asn is at least a factor 2.5, preferably at least a factor 3, more preferably at least a factor 3.5 times higher than the sum of the molar fractions of Asp and Asn in a hydrolysate of the same protein containing substrate which has been completely hydrolyzing a protein containing substrate to free amino acids. In the present invention the term "completely hydrolysed to free amino acids" or "completely hydrolyzing a protein containing substrate to free amino acids" refers to the acid hydrolysis of the protein containing substrate carried out according to the method of Waters (Milford Mass., USA), which method has been described in the Materials & Methods section .

Protein hydrolysates according to the invention are characterised by the presence of certain free amino acids in relatively high molar fractions. Therefore the overall degree of hydrolysis of these protein hydrolysates is still limited. Throughout this patent application the Amino Acid Quotient (AAQ) is used to quantify a measure of degree of hydrolysis. AAQ is the total amount of free amino acids present in a hydrolysate obtained by enzymatically hydrolysing a protein containing substrate relative to the total amount of amino acids present in a hydrolysate obtained by completely hydrolyzing the protein containing substrate to free amino acids. AAQ is expressed as a percentage. AAQ can be calculated by dividing the sum of the molar concentrations of all free amino acids present in a hydrolysate by sum of the molar concentrations of all amino acids present in the hydrolysate when the protein containing substrate is completely hydrolysed to free amino acids ($\times 100\%$). The protein hydrolysates of the invention may have AAQ's ranging from 10 to 50%, preferably from 10 to 40%.

Preferred amino acids are those amino acids capable of generating desirable, food-compatible flavour (taste and aroma) compounds. For example it is known that upon heating with the appropriate sugar glycine can give rise to a beef broth like flavour profile, leucine to a chocolate or bread crust like flavour profile, phenylalanine to a chocolate or caramel like flavour profile, and lysine to potato or boiled meat like flavour profile.

The protein hydrolysates enriched in a specific amino acid or set of amino acids according to the invention in combination with a selected sugar can be used to impart a specific flavour profile on a food or food ingredient. This specific flavour profile can be generated during the cooking, baking or roasting phase of the food preparation as occurs for example, during the baking of bread especially on the crust (wherein a protein hydrolysate of the invention has been added to the dough or on top of the dough). However, the protein hydrolysate and an appropriate sugar can also be pre-reacted (in the absence of the other food ingredients) to obtain a suitable flavouring ingredient.

The conversion of free amino acids into flavour compounds by the action of microorganisms is considerably less well documented than conversions involving Maillard reactions. Although many amino acids have been indicated in the aroma development of fermented products like cheese, fermented sausages and beers, hydrophobic amino acids like valine, leucine, isoleucine and phenylalanine as well as sulfur containing amino acids like methionine are known to be of particular importance. During aging of wine the high levels of free arginine, lysine and alanine are particularly striking.

So particularly Gly, Leu, Val, Pro, Phe, Met and Lys are compounds known to provide, upon heating with an appropriate sugar, desirable flavour compounds. Furthermore Val, Leu, Ile, Phe, Met, Arg, Lys and Ala, are described as amino acids which upon fermentation by the appropriate microorganism, can be converted in flavour compounds as well. So in a preferred embodiment of the invention, the free amino acid is selected from Glu, Leu, Ile, Val, Phe, Tyr, Pro, Met, Lys, Arg, His, Gly, Ala, Ser or Thr, more preferably the amino acid is selected from Glu, Pro, Ala, Gly, Leu, Ile, Val, Pro, Met, Phe, Lys or Arg, most preferably the amino acid is selected from Glu, Leu, Pro, Phe, Lys or Arg.

Protein containing substrates which may be used according to the invention are protein containing materials suitable for human or animal consumption. Preferably the protein content of the protein containing material is substantial, which means that at least 20% w/w is protein. Preferably the protein containing substrate contains at least 40% protein, more preferably at least 50%, most preferably at least 70% proteinbased on weight/dry weight.

Examples of protein containing substrates which may be used according to the invention include vegetable proteins such as soy protein, wheat gluten, rape seed protein, pea protein, alfalfa protein, sunflower protein, fabaceous bean protein, cotton or sesame seed protein, maize protein, barley protein, sorghum protein, potato protein, rice protein, coffee proteins, and animal derived protein such as milk protein (e.g. casein, whey protein), egg white, fish protein, meat protein including gelatin, collagen, blood protein (e.g. haemoglobin), hair, feathers and fish meal. Preferred protein containing substrates include whey protein, hemoglobin, gelatin, casein, maize protein, soy protein and gluten.

Since the protein hydrolysates according to the invention are selectively enriched in specific amino acids, it is evident that protein containing substrates which also belong to the regular ingredients of the relevant end products (food compositions) are preferred. Additionally protein containing substrates which are exceptionally rich in specific amino acids are preferred sources for the protein hydrolysates. Typical examples of the latter protein containing substrates are whey protein (rich in Leu and Lys), wheat gluten (rich in Gln and Pro), chemically deamidated wheat gluten (rich in Glu and Pro), maize protein (rich in Leu and Pro), hemoglobin (rich in Leu, His and Val), fish concentrate or casein (rich in Met and Lys), peanut (rich in Arg), rice protein (rich in Phe and Arg) or protein fraction as for example the α-lactabumine fraction of whey which is rich in tryptophane. The protein hydrolysates obtained may provide flavours to food compositions, and preferably these flavours are not associated with the protein containing substrate. Eg. a cocoa protein hydrolysate is expected to be able to provide a cocoa flavour, whereas it is not expected that a whey or rice protein hydrolysate may provide for a cocoa flavour. So preferably the protein hydrolysates according to the invention provide for novel and unexpected flavours that do not relate to the source of the protein containing substrate. For example, a whey protein hydrolysate provides eg. a meat, cheese or cocoa flavour, instead of a whey protein flavour.

Protein hydrolysates according to the invention can be obtained by hydrolysing the protein containing substrate with suitable endo-proteases and exo-proteases. Whereas prior art enzymatic protein hydrolysis processes typically use crude mixtures of several endo and exoproteases with broad specificity (WO9425580; WO9827827), the hydrolysis process according to the present invention requires careful selection of combinations of endo and exo protease (s). The endo and exo proteases suitable for generating a protein hydrolysate by enzymatic hydrolysis of a protein containing substrate, which protein hydrolysate is at least 2.5 times enriched in certain amino acids compared with the acid hydrolysate of that protein containing substrate, preferably have a preference for cleaving adjacent to a certain or selected set of amino acid residues. Furthermore both the endo and exo proteases suitable for generating a protein hydrolysate by enzymatic hydrolysis of a protein substrate, which protein hydrolysate is at least 2.5 times enriched in certain amino acids compared with the acid hydrolysate of that protein containing substrate, preferably are pure, which means that the endo and/or exoprotease consists mainly, at least for 60%, preferably at least for 75%, more preferably at least for 90% and most preferably at least for 95%, of a single proteolytic activity. Depending on the degree of selectivity of the exopeptidase, a pure or less pure endoprotease is required. Depending on the degree of selectivity of the endoprotease, a pure or less pure exopeptidase is required. Selectivity of the endo and exo protease should at least overlap to obtain the desired protein hydrolysates. So for instance for obtaining a protein hydrolysate of which the free amino acid leucine is at least a factor 2.5 times greater than for the acid hydrolysate of the same protein containing substrate, endo and exoproteases that have some selectivity towards leucine are required. Proteases of high purity can for instance be obtained by purification of crude proteolytic enzyme preparations, or by producing the enzyme using overproducing recombinant DNA strains. The proteases suitable in the present invention are preferably recombinant and/or commercially available for food grade applications. Proteases produced using rDNA-techniques, that is cloning the gene encoding the proteolytic activity in a host organism that over-expresses this gene, usually provide for enzyme preparations comprising less contaminating enzymatic activities and thus may not require costly recovery steps. Well known host organisms that over-express cloned genes include yeasts, fungi or bacteria (for example *Saccharomyces, Kluyveromyces, Aspergillus, Trichoderma, E. coli, Bacillus* etc.)

In order to obtain protein hydrolysates according to the invention, the protein containing substrate may be hydrolysed using a combination of an endo and an exoprotease, wherein at least one of the endo or exoprotease, preferably both the endo and exoprotease, are pure and selective towards a specific set of amino acid(s) or preferentially release the amino acid(s), which is/are intended to be enriched in the protein hydrolysate.

Suitable endoproteases can originate from animal, plant or microbial material. They include recombinant enzymes, eg. enzymes obtained by genetic engineering techniques. Preferred selective endoproteases, which have a preferance for cleaving adjacent to certain amino acids, include trypsin (EC 3.4.21.4), elastase (EC 3.4.21.36), chymotrypsin (EC 3.4.21.1), thermolysin (EC 3.4.24.27), prolyl oligopeptidase (EC 3.4.21.26), glutamyl endopeptidase I (EC 3.4.21.19), microbial collagenase (EC 3.4.24.3), peptidyl-Asp metallopeptidase (EC 3.4.24.33), glycyl endopeptidase (EC 3.4.22.25), saccharolysin (EC 3.4.24.37), neutral protease (EC 3.4.24.28), streptogrisin B (EC 3.4.21.81), glutamyl endopeptidase 11 (EC 3.4.21.82), engineered proline-specific petidyl-prolyl cis-trans isomerases and enzymes with rennet-like specificity, for example microbial rennet, eg. *Mucor* pepsin (EC 3.4.23.23). Preferred non-selective endo proteases, which do not have a strong preference for cleaving adjacent to specific amino acids, but which cleave almost adjacent to a selected group of amino acids, include for instance subtilisin (EC 3.4.21.14) and papain (EC 3.4.22.2).

Suitable exopeptidases (or exoproteases, the terms are interchangeable) can include carboxypeptidases and/or aminopeptidases. These exoenzymes can originate from animal, plant or microbial material. They include recombinant enzymes, eg. obtained by genetic engineering techniques.

Preferred selective carboxypeptidases, which have a preference for cleaving adjacent to certain amino acids, include carboxypeptidase B (EC 3.4.17.2), CPD-1 (pep G) and CPD-II (pep F) from *A. niger* (Dal Degan, et al, Appl. Environ Microbiol, 58(7):2144–2152, 1992).

Preferred non-selective carboxypeptidases, which do not have a strong preference for cleaving adjacent to certain amino acids, but which cleave almost adjacent to any amino acid residue include CPD-$S_1$, from *P. janthinellum* and CPD-Y from *S. cerevisae* (Dal Degan, et al, Appl. Environ Microbial, 58(7):2144–2152, 1992).

Preferred selective aminopeptidases, which have a preference for cleaving adjacent to certain amino acids, include prolyliminopeptidase (EC 3.4.11.5), bacterial leucyl aminopeptidase from *Aeromonas proteolytica* (EC 3.4.11.10) or leucyl aminopeptidase from *Aspergillus* species, and methionyl aminopeptidase (EC 3.4.11.18) and the phenylalanine specific aminopeptidases as described in EP 773990.

Preferred non-selective aminopeptidases, which do not have a strong preference for cleaving adjacent to certain amino acids, but which cleave adjacent to almost any amino acid, include thermophilic aminopeptidase (EC 3.4.11.12).

Preferred combinations of endo- and exoproteases include:

(a) streptogrisin B or trypsin or papain endoprotease with CPD II (to release Arg or Lys);

(b) chymotrypsin or thermolysin or neutral protease with CPD I (to release Tyr, Phe or Trp);

(c) thermolysin or neutral protease with bacterial leucyl aminopeptidase or leucyl aminopeptidase from Aspergillus (to release Leu, Ile, Phe or Val);

(d) neutral protease or subtilisin with CPD I (to release Phe or Ala);

(e) elastase with CPD I (to release Ala);

(f) rennet-like proteases with or leucyl aminopeptidase from Aspergillus or methionyl aminopeptidase (to release Met); and (g) engineered proline-specific peptidyl-prolyl cis trans isomerase (cyproase) with prolyl amino peptidase (to release Pro).

(h) Proline specific endoprotease with malt enzymes or CPD-Y (to release Pro)

(i) Glutamyl endopeptidase with CPD-1 (to release Glu)

To obtain protein hydrolysates with amino acids in their most enriched form and with optimal taste characteristics the preferred combination of endo- and exoprotease could be combined with the appropriate or selected protein containing substrate. By incubating preferred selective enzyme combinations with protein containing substrates which are relatively rich in one or more desired amino acids, preferred enzyme-substrate combinations may be established.

Preferred combinations of enzymes and substrates, to obtain enriched protein hydrolysates, include:

(a) whey protein with trypsin or papain plus a carboxy peptidase CPD II (to enrich in Lys or Arg), or whey protein with thermolysin plus an *Aeromonas proteolytica* aminopeptidase or other leucyl aminopeptidase (to enrich in Leu);

(b) maize protein with thermolysin plus a leucyl aminopeptidase (to enrich in Leu)

(c) rice protein with thermolysin plus leucyl aminopeptidase from *Aspergillus* (to release Phe and Leu); and (d) gluten with engineered proline-specific peptidyl-prolyl cis trans isomerase (cyproase) and prolyl amino peptidase (to release Pro)

(e) corn protein with thermolysin plus a leucine aminopeptidase (to enrich in Leu)

(f) soy protein isolate with trypsin or papain plus a carboxy peptidase CPD II (to enrich in Arg and Lys).

(g) BSA with glutamyl endopeptidase and CPD-I (to release Glu)

(h) Hemoglobin with thermolysin plus leucyl aminopeptidase (to enrich in Leu)

Combinations of substrate and enzymes (endo and exo proteases) can for example result in the following protein hydrolysates:

a whey protein hydrolysate comprising a molar fraction of free leucine of at least 25%, preferably at least 27%, more preferably at least 30%, or a molar fraction of free lysine of, preferably at least 25%, preferably at least 35%, more preferably at least 40%;

a corn protein hydrolysate comprising a molar fraction of free leucine of at least 25%, preferably at least 30%, more preferably at least 35%;

a soy protein hydrolysate comprising a molar fraction of free arginine of at least 25%, preferably at least 30%, or a molar fraction of free lysine of at least 25%;

BSA hydrolysate comprising a molar fraction of free glutamate of at least 25%;

a hemoglobin hydrolysate comprising a molar fraction of free leucine of at least 25%, preferably at least 30%, more preferably at least 35%.

The protein hydrolysates according to the present invention may be prepared by incubating the protein containing substrates with the appropriate enzymes, endo- and exoprotease, under pH and temperature conditions suitable for protein hydrolysis. Suitable pH and temperatures depend on the proteases optimum conditions which may vary from about pH of 3 to 9 and temperature from about 5 to 75° C. Exceptionally conditions outside these ranges may be optimal for the enzymes.

Enzymes and conditions for protein hydrolysis are selected to obtain the desired protein hydrolysate of the invention. E.g. when it is desirable to obtain a whey protein hydrolysate enriched in leucine, then a whey protein substrate is selected and hydrolysed with leucine specific endo and exoproteases under conditions suitable for the endo and exoproteases to specifically release the leucine from whey protein. E.g. whey protein is hydrolysed for five hours with thermolysin and *Aeromonas proteolytica* leucyl aminopeptidase at a pH of 8 at 40° C., to obtain a whey protein hydrolysate wherein the molar fraction of free leucine present in the protein hydrolysate is at least a factor 2.5 times higher than in a hydrolysate of the same whey protein substrate which has been completely hydrolysed to free amino acids. To obtain for comparison a whey protein hydrolysate which has been completely hydrolysed to free aminoacids, whey protein was acid hydrolysed according to Waters (Milford Mass., USA; see Materials & Method section).

To obtain a protein hydrolysate according to the invention, the protein containing substrate is added to water to obtain an aqueous suspension. The protein containing substrate can be added in an amount ranging from 1 to 18%, preferably from 3 to 15%, more preferably from 5 to 13% dry weight protein containing substrate/total weight suspension. The amount may depend on the solubility of the protein containing substrate in water. The endo and exoprotease may already be present in the water wherein the protein containing substrate is added, or the endo and exoprotease can be added after the aqueous suspension of the protein containing substrate has been prepared. Protein containing substrate, endo and exoprotease may be incubated together, or the exoprotease may be incubated after incubation of the protein containing substrate with the endoprotease, wherein optionally the endoprotease has been inactivated before the exoprotease incubation has been started. Conditions of temperature, pH and the like are preferably met before the enzymes are added to the water or suspension. Once the enzymes (endo and exoprotease) and the protein containing substrate are in direct contact, the protein hydrolysis starts. During the protein hydrolysis, the pH may or may not be regulated at a constant pH. If the pH is regulated at a constant pH (or at a pH being kept in a prescribed range), the pH may be adjusted e.g. by addition of any food compatible acid or alkali. For instance sodium or potassium hydroxide may be used as food compatible alkali, and hydrochloric acid may be used as food compatible acid.

Once the desired protein hydrolysate has been obtained in the aqueous suspension, preferably the protein hydrolysis is stopped by inactivating the enzymes present. Inactivation may be effected by lowering the pH to below 5 or increasing the pH to above 8 in combination with heating the suspension above at least 70° C., preferably at least 90° C. Exceptionally conditions outside these ranges may be required to inactivate the proteases. However inactivation should not affect the amino acids and peptides present in the aqueous suspension. A person skilled in the art is able to select the best conditions for inactivating the proteases.

The aqueous suspension comprising the protein hydrolysate according to the invention preferably will be further treated in order to obtain a protein concentrate in the form of for example a powder or paste. The aqueous suspension comprising the protein hydrolysate may e.g. be centrifuged and/or (ultra) filtrated, then concentrated by e.g. evaporation, and optionally dried in any convenient way, such as spraydrying, freeze-drying, fluidised-bed treatment, or a combination of these methods. The person skilled in the art will understand that the method chosen will depend on the formulation of the product (and it's further use). E.g. if the protein hydrolysate is intended to be combined with a specific sugar to induce a specific reaction product upon heating, then the protein hydrolysate will not be exposed to harsh conditions that would induce unwanted (premature) Maillard reactions. If the protein hydrolysate is intended to be used in a food fermentation process, then the conditions used for recovery of the protein hydrolysate should not affect the free amino acids that upon fermentation will generate the desired flavours. The final protein hydrolysate product is preferably formulated in a concentrated form such as for example a concentrated lquid, a paste, a powder or a granulate. The concentrated product comprises at least 20% dry matter (weight dry matter/total weight), preferably at least 30% dry matter (weight dry matter/total weight), more preferably at least 40% dry matter (weight dry matter/total weight. A granulate or powder comprises at least 80% dry matter (weight dry matter/total weight), preferably at least 90% dry matter (weight dry matter/total weight).

Alternatively the aqueous suspension obtained after protein hydrolysis comprising the protein hydrolysate may be directly used in the preparation of reacted flavours or fermented flavours. For instance in the preparation of a reacted flavour, the aqueous suspension comprising the protein hydrolysate e.g. after centrifugation, or concentration may be supplemented with a sugar and thereupon heated. After the reaction, a reacted flavour composition can be obtained, e.g. by concentrating and/or drying of the heated product. In the preparation of a fermented flavour, the aqueous suspension comprising the protein hydrolysate e.g. after centrifugation, or concentration may be incubated with a food grade microorganism, under conditions suitable for the microorganism to ferment the protein hydrolysate. After fermentation, a fermented flavour may be obtained, e.g. by concentrating and/or drying of the fermented product.

Protein hydrolysates comprising free amino acids and peptides obtained after enzymatic hydrolysis of a protein containing substrate, using endoprotease and exoprotease, wherein the molar fraction of at least one free amino acid present in the protein hydrolysate is at least a factor 2.5, preferably at least a factor 3, more preferably at least a factor 3.5 times higher than in a hydrolysate of the same protein containing substrate which has been completely hydrolysed to free amino acids, can be used in several applications including foodstuffs. The protein hydrolysates of the invention can for instance be used in cosmetic formulations for treating hair or skin or can be added to sport drinks to enhance physical endurance recovery. Particularly the protein hydrolysates according to the invention are suitable for use in the preparation of foods, fermented foods and fermented food flavours, and for use in the preparation of reacted flavour compositions, wherein the protein hydrolysate is reacted with a sugar to obtain a reacted flavour composition. Remarkable and outstanding flavour characteristics can be obtained when the protein hydrolysates of the invention are used in the above food preparations. So a protein hydrolysate according to the invention is preferably capable of improving the flavour of a food composition.

The protein hydrolysate of the invention may be used in the preparation of fermented food ingredients or products as described above. Fermented food ingredients or products are prepared by at least one fermentation step, wherein either enzymes endogenous to the food treated are actively involved or food grade microorganisms are incubated with a foodstuff to obtain the fermented foodstuff. Examples of fermented foodstuffs are for instance meat products such as hams or sausages or yogurt, cheese, beer, whiskey, wine and champagne. Fermented food flavours, are flavours obtained from a fermented foodstuff. These fermented food flavours can be obtained by incubating the protein hydrolysate of the invention with a food grade microorganism, which will ferment the protein hydrolysate to desirable food flavours.

A process for producing a fermented food product, wherein a protein hydrolysate according to the invention has been used, will involve the addition of the protein hydrolysate before, or during the fermentation of that fermented food product. The product's endogenous enzymes or the fermenting organisms will convert the specific amino acid in additional flavours characteristic for this type of fermented food. Also flavours not-characteristic for this type of fermented food products may be produced in this way, resulting in fermented food products with surprising new flavours The fermented food product can be for example cheese and the free amino acid of which the molar fraction is at least 2.5 times greater than of the acid hydrolysate is Met, Leu or Phe. In this case the amino acid enriched protein hydrolysate may be added to the milk just before or during the milk clotting process. To minimize the losses of the free amino acids present, the hydrolysate may be added somewhat later in the production process. For example in the production of cheddar cheese the hydrolysate may be added directly together with the salt to the chipped curd. Similarly the protein hydrolysates according to the invention may be incorporated into Enzyme Modified Cheeses to further accelerate the formation of natural cheese aroma's. For the improvement of such dairy products the protein hydrolysate is preferably derived from milk proteins such as casein or whey.

The fermented food product may be beer and the free amino acid of which the molar fraction is at least 2.5 times higher than of the acid hydrolysate is Leu, Ile or Val. In this case the protein hydrolysate may be obtained from rice or barley or corn protein (e.g. for lager beers to improve the aroma profiles of the final product) or it may be obtained from wheat gluten (e.g. for wheat beers to improve the aroma profile of the final product). In the production of beers, the amino acid enriched protein hydrolysates may be added just after the whirlpool or centrifuge and upstream of the vessel where the fermentation by the brewer's yeast takes place.

The fermented food product may also be a fermented or cured meat product for which the protein hydrolysate may be obtained from a meat or blood protein and the free amino acid of which the molar fraction is at least 2.5 times higher than the acid hydrolysate may be Leu, Ile, Phe, Lys, His, Pro or Gly. With fermented meat products the protein hydrolysate may be incorporated together with the other compounds like salt and dextrose or with the microbial starter culture. With cured meat products the protein hydrolysate may be used to produce a "brew" by dissolving the hydrolysate together with appropriate quantities of glucose, salt and nitrite. Inoculation with a suitable mixture of acid and aroma forming microorganisms such as *Lactobacilli* and *Staphylococcus carnosus* generates a aromatic brew after a few days of incubation at temperatures between 10 and 22° C. Upon the addition of diphosphate to neutralize the acid pH value, the brew may be injected into the meat, e.g. a ham. Cooking of the meat, preferably in a bag to keep the aroma's in, finally results in a safe and tasteful product. To stimulate the formation of volatile flavour compounds from the amino acid enriched protein hydrolysate, suitable microbial starter strains are indispensable. The protein hydrolysate according to the invention may also be used in combination with nitrite salt to prepare dry cured ham.

The protein hydrolysate of the invention may be used in the preparation of reacted flavours. The protein hydrolysate and a sugar comprising composition are then reacted to obtain the reacted flavour composition. Sugars may e.g. be selected from aldoses and ketoses as well as disaccharides such as xylose, xylulose, glucose, fructose, maltose, sucrose or mixtures thereof.

The protein hydrolysate and at least one reducing sugar are heated to start a series of reactions known as the Maillard reactions. Amino groups (particularly of free amino acids) react with reducing compounds as a first step. A whole family of other reaction pathways will follow, and finally results in a (complex) reacted flavour composition. By the use of the protein hydrolysate according to the invention, novel types of flavours can be obtained. These (reacted) flavours can be added to foodstuffs to improve the flavour of foodstuffs. To prepare the reacted flavour the amino acid enriched protein hydrolysate and the desired sugar are dissolved in water in an appropriate ratio and then heated. Upon the dissipation of all water the heating process may be stopped immediately or may be continued to reach temperatures of around 120° C. or even 180° C. The latter incubation conditions lead to vastly different flavour and aroma profiles. Ultimately the dry, reacted product may be recovered as a powder and used as a flavouring ingredient.

Alternatively protein hydrolysate and sugar may be reacted in mixtures containing water and e.g. oil or fat, or in the total absence of water e.g. by dissolving sugar and hydrolysate in an essentially water-free system such as for example a polyalcohol. Advantage of this last approach is that even at temperatures above 100° C. the reaction takes place in a liquid and also the final product is a liquid which facilitates the dosing of the flavouring ingredient.

Materials and Methods

Isolated soy protein was obtained as Soyamin 90 HV from Lucas Meyer (Hamburg, Germany)

Corn gluten (Maize gluten) was obtained as Maisin 13875 from Cerestar (Krefeld, Germany).

Whey protein was obtained as either WPC 80 or WPC 75 from Havero Hoogwegt (Gorinchem, the Netherlands).

Hemoglobin was obtained as HGP po-feed (approx. 90% protein) from Harimex (Loenen, The Netherlands).

Bovine serum albumine was obtained as 98% pure Fraction V powder from Sigma-Aldrich.

K. lactis (ATCC 8585) was obtained from ATCC: American Type Culture Collection, 10801 University Boulevard, Manassas, Va. 20110–2209, USA ; Bitec LS-25 Plus starterculture contains a mixture of lactobacilli and Staphylococcus carnosus and is commercially available from Gew ürzmüller; Doetinchem, The Netherlands. Yeast used in bread baking experiments was obtained as fresh block yeast from DSM Gist, Delft, The Netherlands. Cheese starter culture DS 5 LT1 was also obtained from DSM Gist.

Enzymes were either purchased and used as such or obtained as laboratory samples with or without additional purification steps. Aeromonas aminopeptidase and thermolysin were purchased from Sigma. The Aeromonas aminopeptidase as purchased had an activity of 50–150 (Sigma) units per mg protein. A stock solution was prepared containing 15.3 mg solids (as obtained) per ml water, which corresponds with an activity of 630 Sigma units/ml. The thermolysin as purchased had an activity of 50–100 (Sigma) units per mg protein. A stock solution was prepared containing 50 mg solids (as obtained) per ml water which corresponds with an activity of 2200 Sigma units/ml. Trypsin (200 FIP-U/g) was purchased from Merck (Darmstadt, Germany) and was dosed as the dry powder.

Thermoase C160 (thermolysin) (lot nr.P9EB761) 1,650,000 PU (protease units)/gram was obtained from Daiwa Kasei K K (Osaka, Japan).

Corolase LAP (leucyl aminopeptidase from Aspergillus) (batch 1999-07-20) with an activity of 350,000 LAP units/gram was obtained from Röhm Enzyme (Darmstadt, Germany).

Collupuline Liquid (papaine) with an activity of approx. 5000 NF/milligram was obtained from DSM Gist (Seclin, France).

Glutamylendopeptidase from B. intermedius was isolated from a B. subtilis culture as described by Shevelev, A. B. et al in Plasmid (2000), 43(3), 190–199. The activity of the purified enzyme towards Z-Glu-pNA under the described conditions was approx. 1 unit per milligram.

Carboxypeptidase CPD-II (PepF) was obtained from the culture filtrate of an overproducing A. niger strain containing multiple copies of the pepF gene. Using the pepF sequence information as published (van den Hombergh et al. (1994) Gene 151, 73–79) oligonucleotide primers were designed that directly fuse the A. niger glucoamylase (glaA) promoter plus 5'-noncoding sequences, to the pepF structural gene from the ATG startcodon until the TAA stopcodon, using PCR reactions known to persons skilled in the art. Analogous examples of fusions of structural genes to the glucoamylase promoter have been described (EP-A-0 420 358, EP-A-0 463 706 and WO 99/38956). First, the pepF structural gene was PCR amplified from A. niger GAM4 (CBS513.88) chromosomal DNA and purified. Second, the promoter region of the glaA gene was PCR amplified using, at the 3'-end, a primer that overlaps the 5'end of the pepF structural gene. Third, the two PCR fragments were fused via fusion-PCR with a oligonucleotide primer 5' of the glaA promoter, and a oligonucleotide primer overlapping the stopcodon of pepF in the reverse direction. Fourth, the resulting fusion fragment was cloned in A. niger expression vector pGBTOP8 (WO 99/38956), resulting in a fusion plasmid containing the glaA promoter, PepF structural gene and the glaA terminator. This plasmid was digested with NotI and co-transformed with pGBBMS-1, digested with XhoI, to A. niger GAM4 (CBS513.88), essentially as described in WO 99/38956. Transformants selected for growth on acetamide plates were analysed using colony PCR to check for the presence of the pepF expression cassette, using known techniques. A. niger PepF transformants were cultivated in shake flask using the method as described previously (WO 99/38956). After growth for 6 days at 34° C., the culture was ultrafiltrated to remove the mycelium. The CPD II enzyme was purified using a simplified version of the method described by Dal Degan et al (Appl. Environ. Microbiol. 58 (7) pp 2144–2152 (1992)). After dilution with an adequate quantity of buffer A, the ultrafiltrate was applied on a Q Sepharose FF column in an Akta system. Buffer A was 50 mM phosphate buffer pH 6.0 and buffer B 50 mM phosphate pH 6.0 containing 1 M NaCl. Elution was performed with a gradient from 10% buffer B (in buffer A) to 50% buffer B (in buffer A). Active fractions were pooled on the basis of enzymatic activity towards the synthetic peptide FA-Ala-Lys-OH (Bachem) at pH 4.1. The activity of the final, substantially purified enzyme was 1176 U/ml and assayed on 5 mM FA-Ala-Lys-OH in 50 mM sodium acetate/1 mM EDTA pH 4.1. The rate of hydrolysis was was measured at 331 nm during minutes at 25 degrees C. One unit is defined as 1 micromol of substrate cleaved per minute.

Carboxypeptidase CPD-1 (PepG) was isolated from a culture broth of A. niger also according to F. Dal Degan et al.(Appl. Environ. Microbiol., 58 (7), pp. 2144–2152 (1992) with the exception that the CABS-Sepharose step was omitted. The activity of the final, substantially purified enzyme was established to be 150 units/ml on FA-Phe-Ala-OH (Bachem) at pH 4.5 and 25 degrees C. using the activity measurement protocol for this enzyme as provided.

Aminopeptidase II from Bacillus stearothermophilus (strain NCIMB 8924) was isolated according to the procedure described by Stoll et al., (BBA 438 (1976) 212–220). The purity of the enzyme was tested by gel electrophoresis under native and denaturing (SDS) conditions. The identity of the enzyme isolated was confirmed by Edman degradation of 9 amino acids of the aminoterminal end of the enzyme. The enzyme was activated by the addition of CoCl2. Using the Lowry reagent the protein concentration of the final enzyme solution was estimated to be 7.2 mg protein per ml. Using leucine-p-nitroanilide as the substrate, the exopeptidase activity of this solution was established as 420 units per ml. The activity test was carried out at pH 7.2 with 3 millimol per liter of substrate for 15 minutes at 25° C., and the absorption was measured at 400 nanometer against a blank.

Determination of the Molar Concentrations of the Free Amino Acids in a Hydrolysate.

The enzyme incubations with the various protein substrates were carried out with shaking under pH and temperature conditions specified in the Examples. Incubations were terminated after the indicated time intervals by centrifugation at maximum allowable speed for 15 minutes in either an Eppendorf centrifuge or in an Hereaus Megafuge 3.0 R to remove any non dissolved protein substrate. Subsequently the pH of the clear supernatant was adjusted and then heated at 95° C. to destroy any residual proteolytic activity. Any additional precipitate formed was removed by another centrifugation. After removal, the clear supernatant was kept frozen until amino acid analysis could be carried out. Alternatively the clear supernatant was lyophilized to enable further testing in application experiments.

Amino acid analysis was carried out on the clear supernatant according to the PicoTag method as specified in the operators manual of the Amino Acid Analysis System of Waters (Milford Mass., USA). Amino acid analysis took place immediately after thawing the sample material. To that end a suitable sample was obtained from the molten liquid added to dilute acid and homogenized. From the latter solution a new sample was taken, dried and derivatised using phenylisothiocyanate. The various derivatised amino acids present were quantitated using HPLC methods.

Determination of the Molar Concentrations of the Free Amino Acids in a Hydrolysate which is Completely Hydrolyzed to Free Amino Acids.

Acid hydrolysis of the protein hydrolysates to obtain free amino acids, was achieved by vapour phase hydrolysis over 6 N HCl, also according to Waters. In brief this procedure is the following. A sample of the clear protein containing supernatant obtained after enzyme hydrolysis is homogenized in a dilute HCl solution. The resulting solution is then subjected to a vapour phase hydrolysis according to Waters. After this acid hydrolysis the amino acids are derivatised and analysed according to the Picotag method (see above).

Since during acid hydrolysis Trp and Cys are destroyed, these amino acids are not included in the data presented. However, Gln and Asn residues are converted into Glu and Asp during acid hydrolysis so that the values for Glu and Gln, and for Asp and Asn were usually summed together to allow comparison with the data obtained before acid hydrolysis. Only in Example 8 a different procedure was followed.

EXAMPLES

Example 1

Amino acids like leucine and valine have been implicated in Maillard products generating bread crust like odours. To promote the formation of such odours during the baking of bread, it would be advantageous to generate a natural protein hydrolysate which is relatively rich in these two amino acids. In order to achieve selective amino acid enrichment, a protein substrate relatively rich in leucine and valine was combined with a selective endoprotease and a selective exoprotease. The enzyme thermolysin of microbial origin is known to cleave peptide bonds at the amino terminal side of bulky, hydrophobic amino acids like Ile, Leu, Val, and Phe.

Although various selective amino peptidases are known in the scientific literature, most of them have been isolated from mammalian tissue or are known to be membrane bound. The latter two features make these enzymes less attractive for food grade and low cost applications. An exception is the bacterial aminopeptidase from *Aeromomas proteolytica* (EC 3.4.11.10). This enzyme is of microbial origin, is freely soluble and exhibits a clear preference for hydrophobic amino acids and only aspartic, glutamic and cysteic acid are extremely resistant to removal (Prescott, J. M. and Wilkes, S. H., Methods in Enzymol: 45, 530 (1976)).

To release as much leucine as possible without concomitant release of undesired amino acids it is evident that the protein substrate used for enzymatic hydrolysis should be carefully selected. Among the many commercially available protein substrates, only whey protein isolate, hemoglobin and maize protein isolate are relatively rich in leucine and valine. In this Example whey protein isolate (WPC 80) was used.

The protein substrate, thermolysin and *Aeromonas proteolytica* aminopeptidase were all incubated simultaneously under the conditions as specified below. After incubation for 5 hours, the liquids were processed as described in the Materials and Methods section. Precipitated or non-dissolved matter was removed by centrifugation for 15 minutes at maximum velocity in an Eppendorf centrifuge. Supernatant was removed and kept frozen at −20° C.

Samples of the supernatant, were analysed for amino acid content according to the Picotag method of Waters (Milford Mass., USA) immediately after thawing.

Table 1 provides the distribution of the amino acids as present after 6N HCl hydrolysis in comparison with the distribution of the amino acids found after incubation with the enzymes. For all relevant free amino acids the enrichment factor, the molar fraction and the AAQ values were calculated according to the defintions provided. The molar fractions and the enrichment factors are provided for all amino acids (as T+Ae and T+Ae/6N HCl respectively, see Table 1). Trp and Cys values were omitted, Glu and Gln, and Asp and Asn values were summed as one value in table 1.

TABLE 1

| Amino acids | Substrate whey protein isolate | | |
|---|---|---|---|
| | T + Ae | 6N HCl | T + Ae/6N HCl |
| Asn + Asp | 0.3 | 11.2 | 0.0 |
| Glu + Gln | 1.0 | 18.1 | 0.1 |
| Leu | 33.3 | 10.8 | 3.1 |
| Ile | 21.5 | 6.1 | 3.5 |
| Val | 21.4 | 6.6 | 3.2 |
| Phe | 6.9 | 3.4 | 2.0 |
| Tyr | 0.4 | 3.1 | 0.1 |
| Pro | 0 | 5.3 | 0 |
| Met | 4.3 | 2.4 | 1.8 |
| Lys | 1 | 9.6 | 0.1 |
| Arg | 1.7 | 3.3 | 0.5 |
| His | 0 | 1.9 | 0 |
| Gly | 0.3 | 1.7 | 0.2 |
| Ala | 3.5 | 4.8 | 0.7 |
| Ser | 0.9 | 5.1 | 0.2 |
| Thr | 3.2 | 6.7 | 0.5 |
| | 99.7 | 100.1 | |

Key:
T + Ae = molar fraction of amino acids after treatment with thermolysin + *Aeromonas proteolytica* aminopeptidase; unless stated otherwise, in all further examples, the quantity of enzyme added refers to the enzyme preparations as described in the Materials & Methods section. 6N HCl = molar fraction of amino acids obtained after 6N HCl hydrolysis of hydrolysed whey protein after enzyme incubation. (Waters)

$$T + Ae/6N \ HCl = \frac{\text{Molar fraction of AA after T + Ae – incubation}}{\text{Molar fraction of AA after 6N HCl hydrolysis}}$$

This column (T + Ae/6N HCl) shows the enrichment factor of a free aminoacid.
Conditions: to 2 milliliter 100 millimoles/liter phosphate buffer containing 10% (w/w) WPC 80, 20 microliter of thermolysin (Sigma) and 33 microliters *Aeromonas proteolytica* aminopeptidase were added, Incubation was for 5 hours at 40° C.; pH 8.0

Despite the limited selectivity of the two enzymes used, their combination with the whey protein isolate yielded an impressive result: leucine, isoleucine and valine together represented much more than 50% of all available free amino acids (which is at least 3 times more than can be obtained by using the acid hydrolysate of whey). Nevertheless the molar fraction values of isoleucine and valine (both 21.5%) are too low in this experiment so that in the hydrolysate as a whole only leucine (molar fraction of 33.3%) complies. The AAQ level in this incubation was approx. 15%.

Example 2

In Example 1 whey protein isolate was incubated with thermolysin and a selective aminopeptidase obtained from *Aeromonas proteolytica*, the aim being to maximise the yield in relative terms of a specific amino acid which in this case turned out to be leucine. Although a satisfying result was obtained, it remained unclear whether the result was due to the selectivity of the endoprotease or to the selectivity of the exoprotease used.

In this Example incubations were carried out with thermolysin and with either the selective aminopeptidase from *Aeromonas* or with the broad spectrum aminopeptidase APII from *Bacillus stearothermophilus*. The broad spectrum thermophilic aminopeptidase APII was isolated from *Bacillus stearothermophilus* strain NCIMB8924 as described in the Materials and Methods section earlier.

Enzyme incubation was carried out under the conditions specified underneath Table 2 after which the reaction was stopped and processed as described in Example 1. The relatively short incubation period was chosen to minimise the unspecific cleavage pattern of aminopeptidase APII relative to the *Aeromonas* aminopeptidase as much as possible.

TABLE 2

Substrate whey protein isolate

| Amino acid | T + Ae | T + AP | 6N HCl | T + Ae/ 6N HCl | T + AP/ 6N HCl |
|---|---|---|---|---|---|
| Asn + Asp | 0.1 | 4 | 11.2 | 0 | 0.4 |
| Gln + Glu | 0.5 | 3.1 | 18.1 | 0 | 0.2 |
| Leu | 36 | 22.4 | 10.8 | 3.3 | 2.1 |
| Ile | 18.9 | 11.4 | 6.1 | 3.1 | 1.9 |
| Val | 23.9 | 13.8 | 6.6 | 3.6 | 2.1 |
| Phe | 5.8 | 4.6 | 3.4 | 1.7 | 1.4 |
| Tyr | 0.1 | 4.2 | 3.1 | 0 | 1.4 |
| Pro | 0.2 | 0 | 5.3 | 0 | 0 |
| Met | 3.4 | 2.6 | 2.4 | 1.4 | 1.1 |
| Lys | 0.4 | 2.3 | 9.6 | 0 | 0.2 |
| Arg | 3.8 | 3.3 | 3.3 | 1.2 | 1 |
| His | 0.2 | 0.8 | 1.9 | 0.1 | 0.4 |
| Gly | 0 | 2 | 1.7 | 0 | 1.2 |
| Ala | 2.9 | 10.5 | 4.8 | 0.6 | 2.2 |
| Ser | 0.3 | 6.9 | 5.1 | 0.1 | 1.4 |
| Thr | 3.8 | 8.2 | 6.7 | 0.6 | 1.2 |
|  | 100.3 | 100.1 | 100.1 |  |  |

Key:
T + Ae = thermolysin plus *Aeromonas proteolytica* aminopeptidase
T + AP = thermolysin plus *B. stearothermophilus* AP II
6N HCl = 6N HCl hydrolysed whey protein after enzyme incubation (Waters)
Conditions: T + AP: to 1850 microliters of 100 millimoles/liter of phosphate buffer containing 1 millimole/liter of CoCl2 and 10% (w/w) WPC 80, 10 microliter of thermolysin (Sigma) and 140 microliters of *B. stearothermophilus* AP II were added. Incubation was for 1 hour at 60 degrees C., pH 8.0
T + Ae: as Example 1, but with an incubation period of 1 hour only.

The combined activities of thermolysin and *Aeromonas* aminopeptidase yielded leucine representing a molar fraction of 36% of all available free amino acids (which was at least 3 times more than that obtained from acid hydrolysis), an 15 enrichment factor of 3.3. Both incubations showed an AAQ value of approx. 12%.

In the incubation with thermolysin and AP II leucine represents 22% or just about 2 times more than that obtained from acid hydrolysis and not meeting the requirement of a molar fraction of 25% at least. Thermolysin and *Aeromonas* aminopeptidase thus represents the preferred combination for release of leucine from whey protein.

Example 3

In Examples 1 and 2 the selective degradation of whey protein isolate was demonstrated by analysis of the free amino acid content present after incubation with various enzymes. In Example 2 it was shown that the combination of thermolysin plus *Aeromonas* aminopeptidase yielded a hydrolysate which was significantly enriched in leucine (3.3 times) when compared with an acid hydrolysate. Combining thermolysin with *B. stearothermophilus* AP II enzyme yielded a hydrolysate which is enriched in leucine content i.e. by a factor of 2.1 compared with an acid hydrolysate.

To establish whether or not such differences can lead to noticeable odour effects in Maillard reactions, a number of experiments were carried out. In a first experiment 0.13 g of pure leucine was reacted with glucose (0.19 g), fructose (0.19 g), maltose (0.39 g) or sucrose (0.39 g) in water, stirring at a temperature of 135° C. The aim of this experiment was to find out which sugar is most effective in releasing odours in combination with the surplus of leucine present. After about 90 minutes of heating all the water present had evaporated. After about 60 minutes of heating (with some water left), the vials containing glucose and fructose started to generate a sweet bread crust-like odour whilst the vials containing maltose and sucrose gave only a cacao impression. After heating for 100 minutes at 135° C., glucose and fructose generated a weak odour only whilst maltose and sucrose generated a more pronounced sweet bread crust-like odour.

Since incubation with fructose yielded the strongest bread crust-like odour, this sugar was selected for carrying out Maillard reactions with the hydrolysates as specified in Example 2.

Using the data concerning the total free amino acids present in each incubation, 3 reaction vials were prepared containing identical quantities of free amino acids (approximately 40 micromol in two millilitres). If necessary some water was added to obtain identical volumes in each of the 3 vials. Finally a slight molar surplus of fructose was added (55 micromol) to each vial and the reaction was started by heating the vials at a temperature of 127° C.

After dissipation of all the water, an experienced panel was asked to comment on the odours released from each vial. Their comments are summarised in Table 3.

The substrate used attributes a significant dairy character to the initial odour profiles. Significant differences in odour release can be attributed to the samples treated with thermolysin plus AP II versus the samples treated with thermolysin plus *Aeromonas* aminopeptidase. An enrichment factor in particular amino acids of 2.1 only as obtained in the digestion with thermolysin plus AP II is apparently inadequate to generate significantly deviating odours in Maillard reactions.

TABLE 3

| Minutes after water dissipation | T + Ae | T + AP II |
|---|---|---|
| 5 | Dairy, strong cheese | Dairy, weak cheese |
| 20 | Pleasant roasted, cheese | Dairy, weak cheese |
| 35 | Cacao roasted | Not characteristic |

Key:
T + Ae = Whey protein hydrolysate prepared with thermolysin + *Aeromonas proteolytica* aminopeptidase
T + AP II = Whey protein hydrolysate prepared with thermolysin + *Bacillus stearothermophilus* AP II Example 4

In Example 3 we have demonstrated that the protein hydrolysates according to the invention are capable of generating specific aromas in Maillard experiments. Aim of the present Example is to demonstrate that protein hydrolysates according to the invention can also be used to stimulate the formation of specific aromas upon incubation with micro-organisms.

Starting from commercial grade hemoglobin powder (HGP Po-Feed from Harimex, The Netherlands), a 5% (w/v) suspension was prepared in distilled water after which the pH was adjusted to 7.0 using 4 N HCl.

One 500 ml portion of this suspension was incubated with an industrial grade thermolysin (Thermoase C160 from Daiwa Kasei, Japan) and another 500 ml portion of the suspension was incubated with this thermolysin plus an industrial grade leucine-specific aminopeptidase from *Aspergillus* (Corolase LAP from Röhm Enzyme, Germany). Per 500 ml suspension 2.5 gram of the Thermoase powder was added and 0.2 ml of the Corolase LAP liquid. Both enzyme incubations were carried out at 50° C. during 4 hours and then the reactions were stopped by acidifying the liquids to pH 3.0 using 4 N HCl. Immediately thereafter the two acidified suspensions were centrifuged (for 30 minutes at 3500 rpm in a Heraeus Megafuge 3.0 R) to precipitate the heme from the hemoglobin and the two supernatants were collected and subjected to a heat treatment of 30 minutes to 95 degrees C. Of the supernatant that was derived from the incubation with Thermoase and Corolase LAP a small sample was used for amino acid analysis. After that both supernatants were lyophilized. The suspension that was incubated with just Thermoase yielded 20 grams of dry powder and the suspension that was incubated with the 2 enzymes yielded 18 grams of dry powder.

Analysis of the free amino acids as present in the hemoglobin hydrolysate prepared by incubation with both the endo-(i.e. Thermoase) and the exo protease (i.e. Corolase LAP) showed a considerable enrichment of leucine, isoleucine and methionine (Table 4). However, the molar fraction values of both isoleucine and methionine are lower than the required 25% so that only leucine complies. The Amino Acid Quotient of the preparation determined according to the procedure outlined in the Materials and Method section was 15% and leucine represented a molar fraction of 37%. The liberation of amino acids by incubating hemoglobin with Thermoase alone was very limited so that these data were omitted from the Table.

TABLE 4

| | Substrate hemoglobine | | |
|---|---|---|---|
| Amino acid | T + C | 6N HCl | T + C/6N HCl |
| Asn + Asp | 0.2 | 10.7 | 0.0 |
| Gln + Glu | 0.4 | 6.7 | 0.1 |
| LEU | 36.6 | 13.3 | 2.8 |
| ILE | 3.6 | 0.6 | 6.1 |
| VAL | 15.1 | 9.5 | 1.6 |
| PHE | 9.9 | 5.5 | 1.8 |
| TYR | 3.9 | 2.2 | 1.7 |
| PRO | 0.0 | 4.5 | 0.0 |
| MET | 3.4 | 1.0 | 3.5 |
| LYS | 4.1 | 7.9 | 0.5 |
| ARG | 3.5 | 1.1 | 3.1 |
| HIS | 3.0 | 7.5 | 0.4 |
| GLY | 1.0 | 8.2 | 0.1 |
| ALA | 7.3 | 12.7 | 0.6 |
| SER | 1.0 | 5.0 | 0.2 |
| THR | 5.9 | 3.6 | 1.7 |
| | 99.0 | 100.0 | |

Key:
T + C = Thermoase + Corolase LAP
6N HCl = 6N HCl hydrolysed hemoglobin after enzyme incubation.
Conditions: hemoglobin 5% (w/w) in 500 ml water pH 7 and incubated with 2.5 grams Thermoase powder and 200 microliter of Corolase LAP for 4 hours at 50 degrees C.

To prove that a protein hydrolysate enriched in specific amino acids according to the invention can generate specific aroma's in different fermentation processes, a number of experiments were carried out.

In a first experiment the yeast *Kluyveromyces lactis* was grown in minimal media suppleted with either the Thermoase or the Thermoase/Corolase LAP-hydrolysed hemoglobin after which aroma's of the two fermentation broths were compared by an experienced panel. Minimal media containing 40 grams NaCl/liter, 14.2 grams $Na_2HPO_4$ and 0.34 grams $KNO_3$/liter were adjusted to a final pH of 5.5 and suppleted with 0.5 gram/liter of either the Thermoase-hydrolysed hemoglobin powder or the Thermoase/Corolase LAP-hydrolysed hemoglobin powder. The two media were filled in bottles (50 ml in 100 ml bottles) in duplo and sterilized for 20 minutes at 120° C. After reaching a temperature of approx 30° C., the bottles were inoculated with 1% of a fully grown pre-culture of *K. lactis* (ATCC 8585), which was centrifuged and resuspended in the same volume of physiological salt to remove the bulk of free amino acids as present in the YEPD-medium used for the pre-culture. Then the bottles were closed and incubated without shaking for 7 days at 20° C. Upon opening the bottles again, the odour of the atmosphere above the two media were smelled by members of the panel. Their observations are specified in Table 5.

In a second experiment a commercial meat starter culture containing various *lactobacilli* and *Staphylococcus carnosus* was grown in minimal media in the presence of dextrose and nitrite and suppleted again with either the Thermoase- or the Thermoase/Corolase LAP-hydrolysed hemoglobin powder. After incubation, the odour of the two fermentation bottles were compared by an experienced panel. In this experiment the medium contained 6 grams dextrose/liter, 20 grams Colorozo salt/liter (Colorozo salt is a commercial preparation supplied by Verstegen, Rotterdam, The Netherlands and contains 0.6% nitrite in NaCl) and 1 gram/liter of either the Thermoase- or the Thermoase/Corolase LAP hydrolysed hemoglobin powder. The pH value of the two media was adjusted to 5.5 and inoculated with 0.3 gram Bitec LS-25Plus starter culture per liter of medium i.e. without prior sterilisation of the medium. The fermentation took place in closed bottles (50 ml in a 100 ml bottle) at 22° C. for 30 hours, then 15° C. for 2 days and then 6° C. for 3 days. During this period the pH of both fermentations dropped to approximately 4.0.

Like before the odour of the fermentations was examined immediately upon opening of the bottles. The observations of the panel are recorded in Table 5.

TABLE 5

Odour impressions of minimal media suppleted with different hemoglobin hydrolysates and inoculated with different microbial starter cultures.

|  | K. lactis (ATCC 8585) | Meat Starter culture (Bitec LS 25 Plus) |
|---|---|---|
| Thermoase Hydrolysed | Neutral | Neutral |
| Thermoase/Corolase LAP hydrolysed | Much more pronounced. Silage/cidre. | Much more pronounced. Aldehydic green. |

In a third experiment the hemoglobin preparation enriched in leucine according to the invention was tested in an industrially made, dry fermented sausage of the cervelat type.

To that end larger portions of the hemoglobin hydrolysate with just Thermoase or Thermoase plus Corolase LAP and meeting the specifications illustrated in Table 4 were prepared. After lyophilisation quantities of 75 grams of each powder were added to two 8 kilogram portions of the mixure of meat, collagen, fat, cooked rind, dextrose, sodium ascorbate and thoroughly mixed. Apart from salt (with 0.6% nitrite) and pepper no other spices were incorporated to facilitate the identification of any aroma differences caused by the addition of the hydrolysates later on. To a third portion of the meat dough no hydrolysate was added. Prior to the addition of the hydrolysate the meat dough contained approx 17% meat protein. Bitec LS-25 Plus was used as the starter culture in all three preparations.

After incubation periods of 21 days and 49 days at 18 degrees C. to obtain water losses of 20% at least, the sausages were sliced and judged by an experienced panel. Sausages prepared from the dough containing the hemoglobin hydrolysate with high levels of free leucine were considered to have a stronger, more brothy taste than sausages prepared from batter with no hydrolysate added. The taste of sausages containing the hydrolysate incubated with just Thermoase was intermediate, more outspoken than the reference material but less strong than the dough enriched with high levels of free leucine.

Example 5

Hydrolysates according to the invention cannot only be used to endow sausages with more brothy aroma profiles but are also useful to bake bread with a more pronounced bread aromas.

Like whey protein and hemoglobine, corn protein is very rich in leucine but much better suited for the incorporation into bread than any of these alternatives because of its characteristic cereal aroma. Using the same combination of Thermoase and Corolase LAP that was used in Example 4, corn protein (Maisin 13875 from Cerestar, Krefeld, Germany) was digested under conditions specified in the legend of Table 6. After incubation the enzymes were inactivated by lowering the pH to 5.0 using 4N HCl followed by a heating for 45 minutes at 95 degrees C. Samples for amino acid analysis were taken after which the rest of the material was lyophilized.

Amino acid analysis of the enzymatic hydrolysates as well as the 6N HCl hydrolysates shows that free leucine is abundantly produced with an AAQ of 32%, an enrichment factor of 5.8 and as a 41.8% molar fraction. Apart from leucine no other amino acid meets the requirements.

Prior to addition to the dough, quantities of 1.11, 5.56 and 11.13 grams of lyophilised hydrolysate were dissolved in 20 ml of water. One portion of 20 ml water contained no hydrolysate. Then each one of these 20 milliliter water portions were mixed with bread dough containing 2000 grams of flour, 40 grams of salt, 44 grams of fresh yeast and another 1150 milliliters of water containing 80 milligrams of ascorbic acid, 50 milligrams of Fermizyme P200 and 120 milligrams of Fermizyme HS2000 (both from DSM Bakery Ingredients, Delft, The Netherlands).

After a preleavening period of 35 minutes at 30 degrees C., the dough was allowed another leavening period of 75 minutes at 34 degrees C. Baking was for 10 minutes at 280 degrees C. followed by another 20 minutes at 225 degrees C. The next day the bread was sliced and evaluated by an experienced panel.

The lowest hydrolysate dosage (1.11 gram per 3100 grams of dough) had no noticeable effect on the bread aroma. However, the highest addition level (11.13 grams per 3100 grams of dough) resulted in strong flowery aroma which could clearly be distinguished from the bread with no hydrolysate added. Unfortunately this high addition level had a negative effect on the overall loaf volume. The addition of 5.56grams of hydrolysate resulted in a less intense aroma effect but had no detrimental effect on the loaf volume.

TABLE 6

| | Substrate corn protein | | |
|---|---|---|---|
| Amino acid | T + C | 6N HCl | T + C/6N HCl |
| Asn + Asp | 0.8 | 0.1 | 0.1 |
| Glu + Gln | 1.1 | 0.2 | 0.1 |
| Leu | 41.8 | 7.2 | 5.8 |
| Ile | 11.2 | 3.0 | 3.8 |
| Val | 8.9 | 3.6 | 2.5 |
| Phe | 10.6 | 4.3 | 2.5 |
| Tyr | 2.4 | 3.6 | 0.7 |
| Pro | 2.8 | 11.6 | 0.2 |
| Met | 3.2 | 1.1 | 2.9 |
| Lys | 1.7 | 0.8 | 2.1 |
| Arg | 4.0 | 2.8 | 1.4 |
| His | 0.9 | 1.4 | 0.6 |
| Gly | 0.5 | 6.1 | 0.1 |
| Ala | 5.1 | 10.2 | 0.5 |
| Ser | 0.9 | 8.8 | 0.1 |
| Thr | 4.2 | 4.8 | 0.9 |
| | 100.0 | 100.0 | |

Key:
T + C = Thermoase + Corolase LAP
6N HCl = 6N HCl hydrolysed corn protein after enzyme incubation.
Conditions: to 500 ml water containing 6% (w/w) Maisin 2.5 grams of Thermoase was added plus 0.2 milliliter of Corolase LAP. Incubation was for 4 hours at 50° C. at an initial pH of 7.

Example 6

This example illustrates the selective enrichment of lysine or leucine from whey protein isolate (WPC 75) using new combinations of enzymes for this particular substrate. The two hydrolysates formed were then used to influence the organoleptic properties of cheese.

The role of leucine in various aroma generating processes has been adequately illustrated in this application. The use of lysine to generate potato-like tastes in Maillard reactions is also known. Furthermore lysine has been implicated in the taste development of fermentative products like cheese and "sur lie" wines.

Whey protein isolate is extremely rich in lysine and leucine, but has a relatively low content of arginine. To selectively release leucine, the enzyme combination of Thermoase and Corolase LAP was used again (see Table 7). To selectively liberate lysine, the whey protein was first incubated with pancreatic trypsin (from Merck) to cleave at the carboxyl side of arginine or lysine and then, at a lower pH, with the carboxypeptidase CPDII (PepF) of *A. niger*. CPD II exhibits a strong preference for releasing basic amino acids like Arg and Lys. Details of the latter incubation are provided in Table 8.

The enzyme incubation and subsequent processing was as described in the Materials and Methods section. From the data obtained with the combination of Thermoase and Corolase LAP is evident that only leucine meets the criteria with an enrichment factor of 3.1, an AAQ value of 19.1% and a molar fraction value of 34.1% (Table 7). In the incubation with trypsin and CPD II, both lysine and arginine are considerably over represented in the final hydrolysate but only lysine meets the criteria with an enrichment factor of 17.3, an AAQ value of 10.4% and a molar fraction value of 44% (Table 8).

TABLE 7

| | Substrate whey protein | | |
|---|---|---|---|
| Amino acid | T + C | 6N HCl | T + C/6N HCl |
| Asn + Asp | 0.2 | 10.4 | 0.0 |
| Gln + Glu | 0.4 | 15.1 | 0.0 |
| Leu | 34.1 | 10.9 | 3.1 |
| Ile | 19.9 | 6.4 | 3.1 |
| Val | 21.0 | 6.5 | 3.2 |
| Phe | 4.4 | 2.7 | 1.6 |
| Tyr | 0.3 | 2.7 | 0.1 |
| Pro | 0.8 | 7.4 | 0.1 |
| Met | 6.7 | 1.9 | 3.5 |
| Lys | 1.5 | 8.5 | 0.2 |
| Arg | 2.9 | 0.9 | 3.0 |
| His | 1.5 | 1.8 | 0.8 |
| Gly | 0.8 | 3.2 | 0.3 |
| Ala | 2.4 | 7.9 | 0.3 |
| Ser | 0.4 | 5.9 | 0.1 |
| Thr | 2.8 | 7.8 | 0.4 |
| | 100.0 | 100.0 | |

Key:
T + C = Thermoase + Corolase LAP
6N HCl = 6N HCl hydrolysed whey protein after enzyme incubation.
Conditions: WPC 75 was dissolved in 500 milliliter of water to a concentration of 6% (w/w) after which 0.1 gram of Thermoase was added plus 0.20 milliliter of Corolase LAP. Incubation was for 4 hours at 50° C. whilst the pH was continuously adjusted to 7.

TABLE 8

| | Substrate whey protein | | |
|---|---|---|---|
| Amino acid | Tr + F | 6N HCl | Tr + F/6N HCl |
| Asn + Asp | 0.4 | 10.5 | 0.0 |
| Gln + Glu | 3.2 | 16.1 | 0.2 |
| Leu | 5.2 | 9.8 | 0.5 |
| Ile | 3.2 | 6.9 | 0.5 |
| Val | 5.1 | 6.2 | 0.8 |

TABLE 8-continued

| | Substrate whey protein | | |
|---|---|---|---|
| Amino acid | Tr + F | 6N HCl | Tr + F/6N HCl |
| Phe | 5.0 | 2.6 | 2.0 |
| Tyr | 4.8 | 1.8 | 2.6 |
| Pro | 0.4 | 8.5 | 0.1 |
| Met | 5.1 | 2.0 | 2.5 |
| Lys | 44.2 | 2.6 | 17.3 |
| Arg | 14.9 | 2.3 | 6.4 |
| His | 5.2 | 2.1 | 2.5 |
| Gly | 0.1 | 3.4 | 0.0 |
| Ala | 1.9 | 8.5 | 0.2 |
| Ser | 0.3 | 8.0 | 0.0 |
| Thr | 0.9 | 8.7 | 0.1 |
| | 99.9 | 99.9 | |

Key:
Tr + F = Trypsin + CPD II
6N HCl = 6N HCl hydrolysed whey protein after enzyme incubation.
Conditions: WPC 75 was dissolved in 100 milliliters of water to a concentration of 6% (w/w). Then 0.1 g trypsin powder (Merck) was added and incubated for 2 hours at 60° C. and an initial pH of 7. After lowering of the pH to 5 using 4N HCl, 0.2 milliliters of purified CPD II was added and the digestion was continued for another 3 hours at 40° C., pH 5.

As traces of active protease remaining in the hydrolysate can cause severe bitterness in the cheese, both hydrolysates were subjected to a heat treatment of 45 minutes at 95 degrees C. at pH 5 prior to the addition to cheese.

To test the effect of both hydrolysates on the organoleptic characteristics of cheese, the Ch-easy model as developed by the NIZO in the Netherlands was adopted (G. Smit et al, Voedingsmiddelentechnologie 8 (1995)19–21). Pasteurized Ch-easy base allowed to cool off to 30 degrees C. after which a regular starter culture (in this case DS 5 LT1 from DSM Gist, Delft, The Netherlands) was added together with 500 milligrams of either one of the lyophilized hydrolysates per 200 grams of the still liquid Ch-easy base. To the reference material no hydrolysate was added. After thorough mixing with a glass rod the liquid paste was aseptically transferred to small cups in which the material was allowed to settle. Ch-easy ripening took place for 2 weeks at 18 degrees C. after which the various products were evaluated by an experienced taste panel.

Compared with the reference material without additions, the Ch-easy material to which the leucine enriched hydrolysate was added exhibited a much more pronounced odour and flavour profile which would be expected from a much older and riper cheese. The Ch-easy material to which the lysine enriched hydrolysate was added generated a much more modest odour and taste profile and panelists found it hard to discriminate this cheese from the reference.
The texture of the cheeses with the additions proved to be similar to the texture of the cheese with no additions.

Example 7

In Example 6 we have demonstrated that by making the right combinations of enzymes, different protein hydrolysates according to the invention can be produced from a single source of animal protein. Surprising was that hydrolysates which are obtained from the same raw material can lead to different aroma profiles upon incubation with a suitable microbial starter culture.

In this Example we illustrate the versatility of the process according to the invention by subjecting an industrially important plant protein to different enzymes. Once again we are able to create hydrolysates according to the invention that are enriched in different amino acids. In this case in either arginine as a single free amino acid or in arginine plus lysine as two different free amino acids. The potential of such different hydrolysates to generate distinguisable aroma's in a Maillard or a fermentation process has been amply exemplified in the preceding text. Apart from such aroma enhancing activities, free arginine is also considered to be an essential dietary nutrient and has been implicated in the secretion of hormones, in the formation of nitric oxide and in the stimulation of wound healing in humans. Moreover arginine enriched protein hydrolysates have been claimed to posses beneficial properties for personal care applications. So hydrolysates according to the invention are also useful as such.

In this experiment soy protein isolate (Soyamin 90 HV) was first incubated with a combination of plant protease (papaine or Collupuline) and a carboxypeptidase of microbial origin (CPD II) to yield an hydrolysate according to the invention that is enriched in free arginine. From the data provided in Table 9 it follows that only this amino acid with an enrichment of 4.2, and values of 26.9% and 10.3% for the molar fraction and the AAQ value respectively meets all of the criteria.

TABLE 9

Substrate soy protein isolate

| Amino acid | Co + F | 6N HCl | Co + F/6N HCl |
|---|---|---|---|
| Asn + Asp | 3.9 | 10.0 | 0.4 |
| Gln + Glu | 6.8 | 18.9 | 0.4 |
| Leu | 10.7 | 7.1 | 1.5 |
| Ile | 2.0 | 4.3 | 0.5 |
| Val | 3.9 | 5.5 | 0.7 |
| Phe | 3.3 | 3.8 | 0.9 |
| Tyr | 2.3 | 2.6 | 0.9 |
| Pro | 0.0 | 6.7 | — |
| Met | 2.6 | 1.0 | 2.7 |
| Lys | 19.9 | 6.3 | 3.1 |
| Arg | 26.9 | 6.4 | 4.2 |
| His | 3.7 | 2.1 | 1.8 |
| Gly | 5.5 | 8.0 | 0.7 |
| Ala | 3.8 | 5.9 | 0.7 |
| Ser | 3.1 | 6.9 | 0.4 |
| Thr | 2.7 | 4.4 | 0.6 |
|  | 101 | 100.0 |  |

Key:
Co + F = Collupulin + CPD II.
6N HCl = 6N HCl hydrolysed soy protein hydrolysate after enzyme incubation.
Conditions: Soy protein isolate was dissolved in 200 milliliter water to a concentration of 6% (w/w) after which the pH was adjusted to 7.2 and 1 ml Collupulin was added. Incubation was for 2 hours at 60° C. Then the pH was lowered to 5, 0.5 mililiters of CPD II was added and the digestion was continued for another 3 hours at 40 degrees C., initial pH 7.15 and CPD II 3 hours 40° C., pH 5.

In the second incubation the soy protein isolate was incubated with a combination of protease of animal origin (trypsin from Merck) and the microbial CPD II. In this second incubation both arginine and lysine meet all of the criteria with enrichment factors of 5.5 and 3.9 respectively, mol fraction values of 34.7 and 26.2% respectively and an AAQ value of 11.7%. The details of the second incubation are provided in Table 10.

TABLE 10

Substrate soy protein isolate

| Amino acid | Tr + F | 6N HCl | Tr + F/6N HCl |
|---|---|---|---|
| Asn + Asp | 1.6 | 10.8 | 0.1 |
| Gln + Glu | 2.6 | 19.5 | 0.1 |
| Leu | 7.3 | 7.1 | 1.0 |
| Ile | 1.7 | 4.4 | 0.4 |
| Val | 4.2 | 5.0 | 0.8 |
| Phe | 3.8 | 4.1 | 0.9 |
| Tyr | 3.8 | 2.0 | 1.9 |
| Pro | 0.8 | 6.7 | 0.1 |
| Met | 3.1 | 0.9 | 3.4 |
| Lys | 26.2 | 6.7 | 3.9 |
| Arg | 34.7 | 6.3 | 5.5 |
| His | 3.5 | 2.5 | 1.4 |
| Gly | 0.5 | 7.6 | 0.1 |
| Ala | 2.5 | 5.9 | 0.4 |
| Ser | 1.0 | 6.6 | 0.1 |
| Thr | 1.5 | 4.0 | 0.4 |
|  | 98.6 | 100.1 |  |

Key:
Tr + F = Trypsin + CPD II
6N HCl = 6N HCl hydrolysed soy protein isolate after enzyme incubation.
Conditions: Soy protein isolate was dissolved in 200 ml water to a concentration of 6% (w/w). After adjustment of the pH to 7.0, 0.2 gram trypsin powder (Merck) was added and incubated for 2 hours and 30 minutes at 60° C. Then the pH was lowered to 5.0 and 0.5 ml of CPD II was added and incubated for another 3 hours at 40° C.

Example 8

The essential role of free glutamate in a number of aroma forming processes is well documented and MSG, the sodium salt of glutamic acid, is recognized as the single most important taste enhancing component. Seen in this light, it is important to illustrate that protein hydrolysates according to the present invention include versions that are enriched in free glutamic acid with the implication of significant aroma benefits in either Maillard or fermentative processes.

A general problem in demonstrating glutamate enrichment in hydrolysates according to the invention is the measurement of its enrichment factor. Measuring the enrichment factor requires quantitative data on the level of free as well as bound glutamate. Unfortunately bound glutamate cannot be established because during the treatment with 6N HCl bound glutamine is deaminated and converted into glutamate as well. To cicumvent the latter problem, in this Example we have used one of those protein substrates of which the ratio of glutamate versus glutamin residues is exactly known. Having this information available the level of free glutamate after 6N HCl treatment is obtained by a simple multiplication.

Here bovine serum albumine (Sigma) with a Glu to Gln ratio of 91 to 29 (Dairy Technology: Principles of Milk Properties and Processes; P. Walstra ed; Marcel Dekker, Inc) was used and digested with a mixture of a purified glutamyl endopeptidase and a purified CPD I under conditions specified in the legend of Table 11.

According to the data, in the resulting hydrolysate glutamate was enriched with a factor 2.7. The values for the molar fraction and the AAQ were 26.3 and 19.3 respectively.

TABLE 11

Substrate bovine serum albumine

| Amino acids | EG + G | 6N HCl | EG + G/6N HCl |
|---|---|---|---|
| Asn + Asp | 3.1 | 10.1 | 0.3 |
| Glu | 26.3 | 10.0 | 2.7 |
| Gln | 0.0 | 4.7 | — |
| Leu | 10.1 | 10.4 | 1.0 |
| Ile | 0.0 | 2.3 | — |
| Val | 2.7 | 6.0 | 0.5 |
| Phe | 5.1 | 4.7 | 1.1 |
| Tyr | 4.1 | 3.3 | 1.3 |
| Pro | 5.3 | 5.6 | 1.0 |
| Met | 0.8 | 0.9 | 0.9 |
| Lys | 10.7 | 11.5 | 1.0 |
| Arg | 5.3 | 4.2 | 1.3 |
| His | 4.4 | 3.4 | 1.3 |
| Gly | 3.0 | 3.3 | 0.9 |
| Ala | 11.7 | 8.6 | 1.4 |
| Ser | 2.3 | 4.8 | 0.5 |
| Thr | 5.1 | 6.2 | 0.8 |
| | 100.0 | 100.0 | |

Key:
EG + G = Glutamyl endopeptidase + CPD I.
6N HCl = 6N HCl hydrolysed bovine serum albumine after enzyme incubation.
Conditions: Bovine serum albumine was dissolved in 2 milliliter water to a concentration of 5% (w/w) after which the pH was adjusted to 8.0 and 1 milligram of glutamyl endopeptidase was added and incubated for 3 hours and 30 minutes at 50° C. Then the pH was lowered to 5.0 and 0.05 milliliters CPD I was added and incubated for another 25 minutes 50° C.

What is claimed is:

1. A protein hydrolysate obtainable by the enzymatic hydrolysis of a protein-containing substrate; which hydrolysate comprises free amino acids and peptides;
wherein the molar fraction of at least one free amino acid present in the protein hydrolysate is at least a factor 2.5 higher than in a hydrolysate of the same protein-containing substrate which has been completely hydrolyzed to free amino acids; and
wherein the molar fraction of the at least one free amino acid in the protein hydrolysate is at least 25%; and
wherein the Amino Acid Quotient (AAQ) in the protein hydrolysate is at least 10%.

2. A protein hydrolysate of claim 1, wherein the AAQ is from 15 to 50%.

3. A protein hydrolysate of claim 1, wherein the enzymatic hydrolysis is by at least one endoprotease and at least one exoprotease.

4. A protein hydrolysate of claim 1, wherein the at least one free amino acid is selected from Glu, Leu, Ile, Val, Phe, Tyr, Pro, Met, Lys, Arg, His, Gly, Ala, Ser and Thr.

5. A protein hydrolysate of claim 1, in the form of a concentrated liquid, a paste, a powder or a granulate.

6. A protein hydrolysate of claim 1, wherein the protein-containing substrate is selected from whey protein, hemoglobin, bovine serum albumin, casein, rice, gluten and soy protein.

7. A protein hydrolysate of claim 1, wherein the protein hydrolysate is capable of improving the flavour of a food composition.

8. A process for preparing a protein hydrolysate, which process comprises: incubating a protein-containing substrate under aqueous conditions at a temperature of 5 to 75° C., and at a pH of 3 to 9, with at least one endoprotease and at least one exoprotease, for a time sufficient to obtain said protein-containing hydrolysate, wherein the molar fraction of at least one free amino acid present in the protein hydrolysate is at least a factor 2.5 higher than in a hydrolysate of the same protein containing substrate which has been completely hydrolyzed to free amino acids, and
wherein the molar fraction of the at least one free amino acid in the protein hydrolysate is at least 25%; and
wherein the Amino Acid Quotient (AAQ) in the protein hydrolysate is at least 10%.

9. A food composition comprising a protein hydrolysate of claim 1.

10. A food composition of claim 9, wherein the food composition is a fermented food product.

11. A food composition of claim 9, wherein the food composition comprises a reacted flavour.

12. A protein hydrolysate characterized in that it is either (a) a whey protein hydrolysate comprising a molar fraction of free Leu of at least 25%, or a molar fraction of free Lys of at least 25%; (b) a maize protein hydrolysate comprising a molar fraction of free Leu of at least 25%, (c) a soy protein hydrolysate comprising a molar fraction of free Arg of at least 25%, or a molar fraction of free Lys of at least 25%, (d) a BSA protein hydrolysate comprising a molar fraction of free Glu of at least 25%; or (e) a hemoglobin hydrolysate comprising a molar fraction of free Leu of at least 25%.

13. A process for preparing a fermented protein hydrolysate which comprises fermenting the protein hydrolysate of claim 1 with a food grade microorganism.

14. The protein hydrolysate of claim 4, wherein the at least one free amino acid is selected from Glu, Pro, Ala, Gly, Leu, Ile, Val, Met, Pro, Phe, Lys and Arg.

15. The protein hydrolysate of claim 14, wherein the at least one free amino acid is Glu, Leu, Pro, Phe, Lys or Arg.

16. The protein hydrolysate of claim 1, wherein the at least one free amino acid is at least a factor of 3 times higher than in a hydrolysate of the same protein-containing substrate which has been completely hydrolyzed to free amino acids.

17. The protein hydrolysate of claim 16, wherein the at least one free amino acid is at least a factor of 3.5 times higher than in a hydrolysate of the same protein-containing substrate which has been completely hydrolyzed to free amino acids.

18. The protein hydrolysate of claim 2, wherein the AAQ is 15–40%.

19. The fermented food product of claim 10, which is cheese and wherein the at least one free amino acid is Met.

20. The fermented food product of claim 10, which is fermented sausage and the at least one free amino acid is Leu or Phe.

21. The fermented food product of claim 10, which is beer and the at least one free amino acid is Leu, Val or Ile.

22. The fermented food product of claim 10, which is wine and the at least one free amino acid is Arg or Leu.

23. The fermented food product of claim 10, which is whiskey and the at least one free amino acid is Val.

24. A method to prepare a food composition which method comprises adding the protein hydrolysate of claim 1 to additional food components.

* * * * *